United States Patent [19]

Suimon

[11] Patent Number: 4,857,789
[45] Date of Patent: Aug. 15, 1989

[54] ROTARY-TYPE ELECTROMAGNETIC ACTUATOR FOR TOYS

[75] Inventor: Yoshio Suimon, Tokyo, Japan

[73] Assignee: Kabushiki Kaisha Hanzawa Corporation, Tokyo, Japan

[21] Appl. No.: 134,180

[22] Filed: Dec. 16, 1987

[30] Foreign Application Priority Data

Jun. 26, 1987 [JP] Japan .................. 62-157802

[51] Int. Cl.⁴ .............. H02K 15/16; H01R 39/44; H01R 41/00; A63H 33/26
[52] U.S. Cl. .................. 310/233; 310/116; 310/154; 310/241; 335/222; 446/454; 446/460
[58] Field of Search ............... 310/40 MM, 116, 239, 310/241, 246, 154, 233, 244, 248; 335/222; 446/454, 456, 460

[56] References Cited

U.S. PATENT DOCUMENTS

| | | | |
|---|---|---|---|
| 2,875,410 | 2/1959 | Lamb | 335/222 |
| 3,096,452 | 7/1963 | Haydon | 310/233 |
| 4,339,384 | 8/1983 | Lucherini | 310/241 |
| 4,471,566 | 9/1984 | Ishimoto | 446/460 |
| 4,494,026 | 1/1985 | Abe | 310/40 MM |

Primary Examiner—Patrick R. Salce
Assistant Examiner—D. L. Rebsch
Attorney, Agent, or Firm—Ladas & Parry

[57] ABSTRACT

A rotary-type electromagnetic actuator for a toy includes a cylindrical magnetic stator fixedly mounted within a housing, a rotor arranged concentrically within the stator and rotatably supported by a shaft within the housing, a coil wound on the rotor for causing the rotor to rotate back and forth by being energized and deenergized, a commutator fixedly secured to the shaft of the rotor for supplying current to the coil, a rotor position-correcting member turnably provided inside the housing in opposition to the commutator and in concentric relation with respect to the housing, and a pair of current feeding brushes embracing the commutator from both sides thereof, each of the current brushes having one end secured to the position-correcting member and another end in pressing contact with a respective commutator bar of the commutator. The coil is energized by dc power supplied through the brushes and commutator. When the rotor position-correcting member is turned, the brushes secured thereto cause the commutator, which is being embraced by the brushes, to rotate together with the rotor in the direction in which the position-correcting member is being turned, thereby setting the rotor home position, which prevails when the coil is in the deenergized state, to conform to the toy being operated.

2 Claims, 3 Drawing Sheets

ROTARY-TYPE ELECTROMAGNETIC ACTUATOR FOR TOYS

BACKGROUND OF THE INVENTION

1. Field of the Invention

This invention relates to a rotary-type electromagnetic actuator applicable to the steering of a toy automobile, the opening and closing of a hand of a toy robot, the blinking of an eye of a doll, etc. More particularly, the invention relates to a rotary-type electromagnetic actuator which makes possible back-and-forth rotational motion through an angle of 360° or less by the energization of a coil, and wherein brushes for supplying the coil on the rotor side with electric current also function to adjust a home position to which the rotor is returned.

2. Description of the Prior Art

FIGS. 5 and 6 illustrate an example of a conventional rotary-type electromagnetic actuator adapted to steer a radio-controlled toy automobile. As shown in FIGS. 5 and 6, the conventional electromagnetic actuator includes a generally box-shaped actuator receptacle 1 molded as an integral part of a synthetic resin chassis 1a and having its upper side open, a cylindrical stator 2 comprising a magnet securely mounted within the receptacle 1, and a generally I-shaped rotor 3 arranged within the stator 2 in concentric relation therewith. A shaft 4 fixedly penetrates the rotor 3 at its center and has both its ends rotatably supported by bearings 5a, 5b formed in respective openings located in the upper edge of the receptacle 1. A coil 6 is wound on an end portion of the rotor 3 and is adapted to be supplied with dc power (+), (−) through flexible lead wires 6a, 6b connected to respective ends of the coil. A forward or reverse torque is produced in the rotor 3 by changing the polarity of the DC power supplied to the coil 6. A cover 7 made of synthetic resin is affixed to the edge of the open upper side of receptacle 1 by an adhesive or other suitable means to cover the upper side of the stator 2. One side of the cover 7 is formed to include an aperture 8 through which the lead wires 6a, 6b of coil 6 may be led out from the receptacle 1. Stoppers 9a, 9b for limiting the angle of rotation of the rotor 3 in the forward and reverse directions are secured to the inner wall surface of the stator 2.

When the coil 6 of this rotary-type electromagnetic actuator having the above-described construction is not being supplied with current and, hence, is in the deenergized state, both ends of the rotor 3 are attracted to the N and S magnetized portions of the stator 2 so that the position of the rotor 3 is maintained, as shown in FIG. 6. If the dc power is now supplied to the coil 6 with the polarity shown in FIG. 6, the rotor 3 will rotate in the direction of arrow A in FIG. 6 until it strikes the stopper 9a, at which angular position the rotor 3 will be held. The resulting rotational torque is transmitted from the shaft 4 to the front wheels (not shown) of the toy automobile through a linkage mechanism (not shown), so that the front wheels will be steered to the right (or left) side.

If the dc current supplied to the coil 6 has a polarity which is the opposite of that shown in FIG. 6, the rotor 3 will rotate in a direction opposite that of arrow A until it strikes the stopper 9b, at which angular position the rotor 3 will be maintained. If the current supplied to coil 6 is cut off, the rotor 3 will be returned to the home position shown in FIG. 6 by the magnetic force of the stator 2.

When the rotor 3 in this conventional actuator rotates back and forth in the manner described, the lead wires 6a, 6b of the coil 6 swing back and forth in the direction of the rotor 3. As a result, flexure stress concentrates at the portions where the coil 6 and lead wires 6a, 6b are soldered together. In consequence, these portions tend to break, causing the actuator to malfunction. Another problem with the conventional arrangement is that a spring force possessed by the lead wires 6a, 6b inhibits the motion of the rotor 3 and does not allow the rotor 3 to return to its home position in a stable manner. Consequently, when this electromagnetic actuator is mounted on, say, the chassis of a toy automobile and the rotor shaft 4 is connected to the front-wheel steering linkage mechanism in order for the actuator to be used to steer the toy automobile, there is no assurance that the front wheels will always be aligned straight ahead when the coil 6 is in the deenergized state. This can impede the performance of a radio-controlled toy automobile in a race and detract from the steerability of the toy automobile. Moreover, if machining or assembly errors exist in the front-wheel steering linkage mechanism or there is an error in the mounting of the electromagnetic actuator on the toy chassis or a machining error in the receptacle 1, this will directly affect the straight-ahead attitude of the front wheels relative to the home position of the rotor 3. As a result, the front wheels will be offset to the left or right and will not be maintainable in the straight-ahead attitude. Correcting this offset of the front wheels is a troublesome and time-consuming task.

Further, in order for the movement of the lead wires 6a, 6b that swing with the back-and-forth rotational motion of the rotor 3 not to be impeded, the aperture 8 through which these wires are passed must be made large in size. When this is done, however, sand, dust and other contaminants readily penetrate the interior of the receptacle and can cause the actuator to develop a variety of problems. In addition, since the receptacle 1 is molded as an integral part of the chassis, use of the electromagnetic actuator installed within the receptacle is restricted to the toy automobile exclusively, so that the actuator cannot be used for some other purpose. A problem that results is higher cost.

SUMMARY OF THE INVENTION

An object of the present invention is to provide a general-purpose, low-cost rotary-type electromagnetic actuator for toys in which it is possible to supply current stably with little risk of failure by eliminating breakage of the lead wires that carry the current, and in which the home position of the rotor can be easily corrected in accordance with the toy to be operated.

In accordance with the present invention, the foregoing object is attained by providing a rotary-type electromagnetic actuator for a toy comprising a housing having a sealed-type structure, a cylindrical stator comprising a magnet fixedly mounted within the housing, a rotor arranged within the stator in concentric relation therewith and having a shaft by which it is supported so as to be rotatable within the housing, a coil wound on the rotor for causing the rotor to rotate back and forth by being energized and deenergized, a commutator having a generally rectangular outer periphery and a pair of commutator bars and fixedly secured to the shaft of the rotor for supplying current to the coil, a rotor position correcting member turnably provided inside the housing in opposition to the commutator and in concentric relation with respect to the housing, and a pair of current feeding brushes embracing the commutator from both sides thereof, each of the current brushes having a first end secured to the position correcting member and a second end in pressing contact with a respective one of the commutator bars.

Energization of the coil which rotates the rotor back and forth is performed through the brushes and commutator. Accordingly, the current is fed through the coil reliably and breakage of the current supplying lead wires can be prevented. When the rotor position correcting member is turned, the current feeding brushes integrally secured thereto cause the commutator, which is being embraced by the brushes, to rotate together with the rotor in the direction in which the position correcting member is being turned. This makes it possible to correct and set the rotor home position, which prevails when the coil is in the deenergized state, to conform to the toy being operated.

Since such components as the stator and rotor are mounted within the housing to construct a separate unit, the actuator is suitable for general-purpose use.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the invention will now be described with reference to FIGS. 1 through 4.

Figure 1:
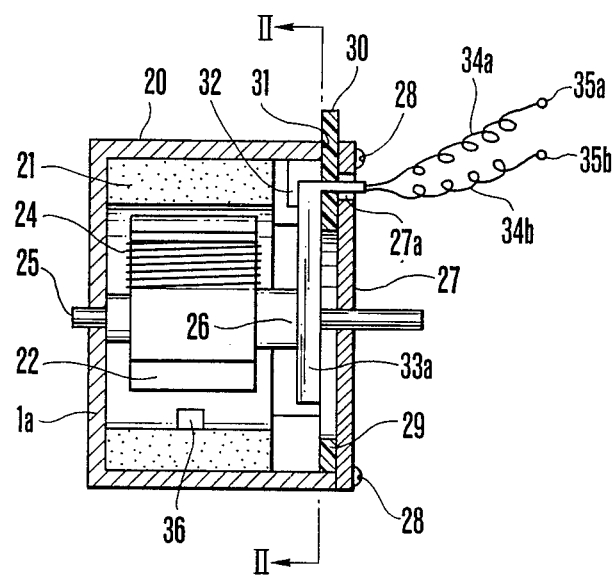
FIG. 1 is a sectional view illustrating a preferred embodiment of a rotary-type electromagnetic actuator for toys in accordance with the present invention.
Figure 2:
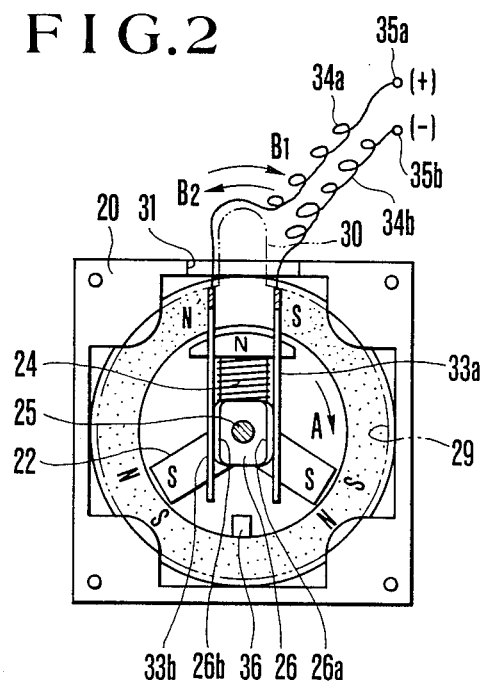
FIG. 2 is a sectional view taken along line II—II of FIG. 1.

FIG. 1 is a sectional view illustrating a peeferred embodiment of a rotary-type electromagnetic actuator for toys in accordance with the present invention, and FIG. 2 is a sectional view taken along line II—II of FIG. 1. As shown in FIGS. 1 and 2, the actuator of the invention includes a synthetic resin housing 20 having a generally rectangular, box-shaped configuration open on one side, a cylindrical stator 21 comprising a magnet fitted securely inside the housing 21 and magnetized as shown in FIG. 2, and a generally star-shaped rotor 22 arranged inside the stator 21 in concentric relation therewith. The rotor 22 is equipped with a coil 24 wound on one arm thereof. A shaft 25 is passed through and secured to the rotor 22 at the rotational center thereof. Fixedly secured to the shaft 25 is a current feeding commutator 26 having a pair of bracket-shaped commutator bars 26a, 26b to which respective ends of the coil 24 are connected. The shaft 25 has two ends, one of which is rotatably supported by a closure plate 27 closing the opening in the housing 20, the other of which is rotatably supported by a side wall 1a of the housing 20, the side wall 1a being opposite the closure plate 27. The latter is integrally secured to the housing 20 by tapping screws 28.

Figure 3:
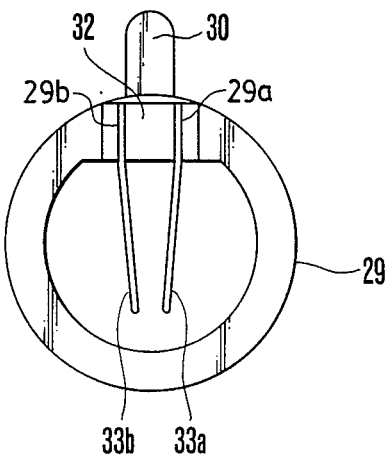
FIG. 3 is a front view illustrating a preferred embodiment of a rotor position correcting member according to the present invention.
Figure 4:
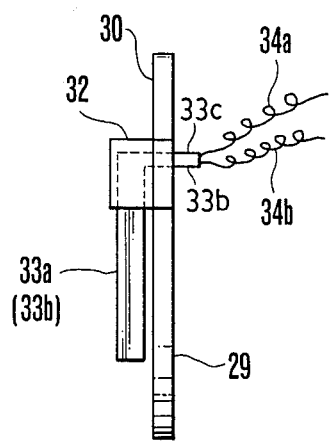
FIG. 4 is a side view of the rotor position correcting member.
Figure 5:
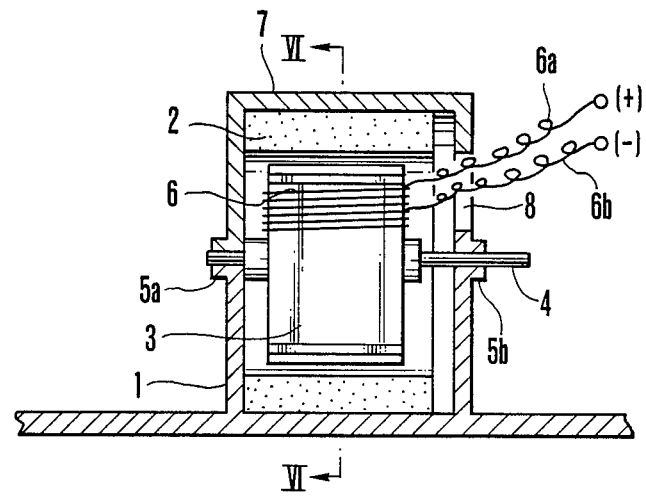
FIG. 5 is a sectional view illustrating a rotary-type electromagnetic actuator according to the prior art.
Figure 6:
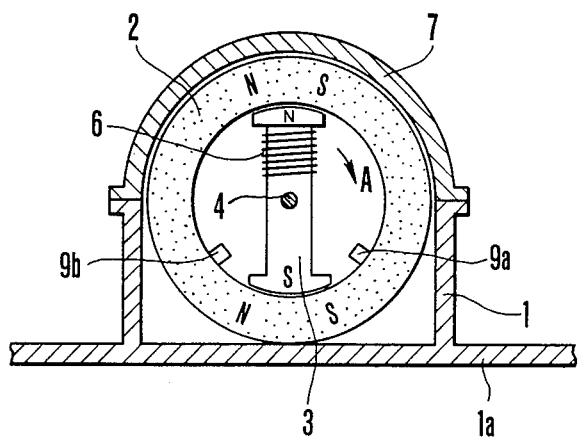
FIG. 6 is a sectional view taken along line VI—VI of FIG. 5.

The actuator further includes a ring-shaped position correcting member 29 mounted rotatably in the opening of the housing 20 in concentric relation with stator 21 and retained by the closure plate 27. The position correcting member 29 is for adjusting the home position of the rotor 22 in the circumferential direction with respect to the stator 21 when the coil is in the deenergized state. The edge of the position correcting member 29 at the upper portion thereof is provide with a manipulating member 30 projecting radially outwardly. The manipulating member 30 projects outwardly of the housing through an aperture 31 formed between the edge at the open side of the housing 20 and the closure plate 27. The inner surface of the position correcting member 29 is provided with a brush mounting portion 32 closely adjacent the manipulating member 30 the position correcting member 29 and the brush mounting portion 32 are made of electrical insulating material. Brush mounting portion 32 is comprised of a pair of slits 29a, 29b which are clearly shown in FIG. 3 as parallel and vertically arranged with respect to one another. As shown in FIGS. 3 and 4, strip-shaped brushes 33a, 33b, each comprising a copper plate, have first end portions thereof secured to opposite sides of the mounting portion 32 in such a manner that the brushes oppose the upper portions of brushes 33a, 33b are fixed to the pair of slits 29a, 29b. These upper portions of the brushes 33a, 33b can be seen to be horizontally bent to form the horizontal projections 33c, 33b. Lead wires 34a, 34b are connected to horizontal projections 33c, 33b. Since the position correcting member 29 and the brush mounting portion 32 are made of electrical insulating material, the brushes 33a and 33b are electrically insulated therefrom. The other or second ends of the brushes 33a, 33b are in pressing contact with the commutator bars 26a, 26b, respectively, of the commutator 26. Thus, the brushes 33a, 33b embrace the commutator 26 from the left and right sides thereof. The first ends of the brushes 33a, 33b project externally of the closure plate 27 via a slot 27a formed in the closure plate 27, and these projecting end each are connected to one end of lead wires 34b, 34a, respectively. The other ends of these lead wires 34a, 34b, are connected to respective dc power supply terminals 35a, 35b, which are provided on a stationary portion of the apparatus. A stopper 36 for limiting the angle of rotation of the rotor 22 is fixedly secured to the inner circumferential surface of the stator 21. The slot 27a is closed from the inner side by the position correcting member 29.

The operation of the electromagnetic actuator having the construction set forth above will now be described.

When the coil 24 is in the deenergized state, each arm of the rotor 22 is attracted by the N-, S-magnetized portions of the stator 21, as shown in FIG. 2, so that the rotor 22 is held in the position shown. This position is maintained stably, without deviation, by the spring force of the brushes 33a, 33b in pressing surface contact with the commutator bars 26a, 26b.

When a direct current is applied in the polarities shown in FIG. 2 to the power supply terminals 35a, 35b with the rotary-type electromagnetic actuator in the present state, the current flows into the coil 24 via the (+) terminal 35a, lead wire 34a, brush 33a and commutator bar 26a, and the current flows out of the coil via commutator bar 26b, brush 33b, lead wire 34b and the (−) terminal 35b. Consequently, the arms of the rotor 22 are excited to the respective polarities shown in FIG. 2, whereby the rotor 22 is rotated in the direction of arrow A in FIG. 2 until one of its arms strikes the stopper 36, at which angular position the rotor 22 is maintained. The rotational torque which prevails at this time is transmitted from the shaft 25 to, e.g., the front wheels (not shown) of a toy automobile via a linkage mechanism (not shown). As a result, the front wheels are turned to the left or right from the straight-ahead position.

When the current being supplied to the coil 24 is cut off to deenergize the same, the rotor 22 is immediately restored to the home position shown in FIG. 2 by the magnetic force of the stator 21.

When a direct current is supplied to the coil 24 in polarities opposite to those shown in FIG. 2, the arms of the rotor 22 are excited to polarities opposite to those shown in FIG. 2, whereby the rotor 22 is rotated in a direction opposite that of arrow A in FIG. 2 until one of its arms it strikes the stopper 36, at which angular position the rotor 22 is maintained.

The manner in which the home position of the rotor 22 (the position shown in FIG. 2) is corrected in accordance with the toy to be operated will now be described.

A difference will develop between the straight-ahead position of the front wheels and the home position of the rotor 22 due to any assembly error in the electromagnetic actuator, an error in the installation thereof or errors in machining and assembly in the linkage mechanism connected to a king pin of the front wheels, as a result of which the front wheels will deviate slightly to the left or right of the straight-ahead attitude. If such is the case and this is to be corrected for, the first step is to loosen the fastening screws 28 of the closure plate 27 just enough so that the position correcting member 29 can be turned. This is followed by moving the manipulating member 30 in the direction of arrow B1 or B2 in FIG. 2. When this is done, the position correcting member 29 integral with the manipulating member 30 and the brushes 33a, 33b attached to the position correcting member 29 turn in the same direction as the manipulating member. In consequence, the rectangular commutator 26 embraced from both its left and right sides by the brushes 33a, 33b turns in the same direction as the manipulating member 30 and, at the same time, the rotor 22 and its shaft 25 also rotate in the same direction. At the moment the front wheels are corrected and brought into alignment with the straight-ahead attitude, the user stops turning the manipulating member 30 in the aforementioned direction B1 or B2 and then tightens the screws 28 to fix the position correcting member 29.

The aforementioned operation makes it possible to simply adjust the straight-ahead attitude of the front wheels while the various mechanisms constituting the apparatus are left in the assembled state. In addition, since the supply of dc power to the coil 22 is performed via the brushes 33a, 33b and commutator 26, the lead wires 34a, 34b are not flexed and deformed by the back-and-forth rotational motion of the rotor 22, as occurs in the prior art. As a result, the current feeding lead wires 34a, 34b will not break, the current can be fed to the coil stably and with certainty at all times, and the service life of the electromagnetic actuator can be prolonged. Moreover, since the stator 21, rotor 22, commutator 26, brushes 33a, 33b and other components are mounted within the sealed housing 20 to form a discrete unit or module, dust and other particles will not invade the interior of the actuator, the service life of the actuator is prolonged and, by virtue of the modular design, the actuator has a broader field of utilization, thus lending itself to more general-purpose applications. The actuator can be mass-produced and manufactured at a lower cost.

In the illustrated embodiment, the rotary-type electromagnetic actuator of the invention is applied to the steering of a toy automobile. However, the invention is not limited to this embodiment and obviously can be adapted to blink the eye of a doll and to changeover the clutch of a traveling toy that is not limited to a toy automobile. Furthermore, though the rotor 22 in the illustrated embodiment has a star-shaped configuration, an I-shaped rotor can also be employed. In addition, the shape of the position correcting member 29 is not limited to that shown in the illustrated embodiment.

Thus, the present invention has a number of advantages. Specifically, since the feed of current to the coil 24, which is for rotating the rotor 22 back and forth by being energized and deenergized, is performed by the generally rectangular commutator 26 provided on the shaft 25 and the current feeding brushes 33a, 33b in pressured contact with the commutator bars of the commutator 26, the current feeding lead wires 34a, 34b will not break, thus making it possible to stably supply the coil 24 with current with little risk of failure. Furthermore, since the brushes 33a, 33b are held by the rotor position correcting member 29 rotatably provided in the housing 20, and, moreover, since the commutator 26 is embraced from both sides by the brushes 33a, 33b, turning the position correcting member 29 makes it possible to adjust the home position of the rotor 22 when the coil 24 is in the deenergized state. Accordingly, when the straight-ahead position of, e.g., the front wheels of a toy automobile is to be corrected after the toy is assembled, this can be accomplished in a simple manner merely by manipulating the position correcting member 29 to correct the home position of the rotor 22.

Furthermore, since the actuator has a modulator configuration and a sealed structure, the penetration of dust and other contaminants can be prevented. The actuator is low in cost and applicable to a broader range of uses.

As many apparently widely different embodiments of the present invention can be made without departing from the spirit and scope thereof, it is to be understood that the invention is not limited to the specific embodiments thereof except as defined in the appended claims.

What is claimed is:

1. A rotary-type electromagnetic actuator for a toy, comprising:
   a housing having a sealed-type structure;
   a cylindrical stator comprising a magnet fixedly mounted within said housing;
   a rotor arranged within said stator in concentric relation therewith and having a shaft by which it is supported so as to be rotatable within said housing;
   a coil wound on said rotor for causing said rotor to rotate back and forth by being energized and deenergized;
   a commutator having a generally rectangular outer periphery and a pair of commutator bars and fixedly secured to the shaft of said rotor for supplying current to said coil;

an electrically isulated rotor position correcting member turnably provided inside said housing in opposition to said commutator and in concentric relation with respect to said housing; and a pair of current feeding brushes embracing said commutator from both sides thereof, each of said current brushes having a first end secured to said position correcting member and a second end in pressing contact with a respective one of said commutator bars.

2. The actuator according to claim 1, wherein said position correcting member comprises:
 a ring-shaped body rotatable clockwise and counterclockwise, and
 a manipulating member extending radially outward from said ring-shaped body and projecting outwardly of said housing for being manipulated to rotate said ring-shaped body clockwise and counterclockwise.

* * * * *